United States Patent
Yamamoto et al.

(10) Patent No.: US 8,219,818 B2
(45) Date of Patent: Jul. 10, 2012

(54) INFORMATION PROCESSING APPARATUS, INFORMATION RECORDING MEDIUM, INFORMATION PROCESSING METHOD, AND INFORMATION PROCESSING PROGRAM

(75) Inventors: Kazuo Yamamoto, Chiba (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 654 days.

(21) Appl. No.: 12/436,323

(22) Filed: May 6, 2009

(65) Prior Publication Data

US 2009/0287934 A1    Nov. 19, 2009

(30) Foreign Application Priority Data

May 16, 2008    (JP) .................................. 2008-129140

(51) Int. Cl.
*G06F 21/00*    (2006.01)
(52) U.S. Cl. ............................ 713/176; 726/26; 380/201
(58) Field of Classification Search .................... None
See application file for complete search history.

(56) References Cited

U.S. PATENT DOCUMENTS

| | | | |
|---|---|---|---|
| 6,785,815 B1 * | 8/2004 | Serret-Avila et al. | 713/176 |
| 2004/0243814 A1 * | 12/2004 | Nakano et al. | 713/189 |
| 2006/0206945 A1 * | 9/2006 | Kato et al. | 726/27 |
| 2010/0100969 A1 * | 4/2010 | Yamaguchi et al. | 726/30 |

* cited by examiner

*Primary Examiner* — Oscar Louie
(74) *Attorney, Agent, or Firm* — Oblon, Spivak, McClelland, Maier & Neustadt, L.L.P.

(57) ABSTRACT

An information processing apparatus includes: a reproducing unit that reads, from a disc, a content and a content code file storing a content code that includes at least any one of a program or conversion data applied to a content reproducing process, to execute the content reproducing process; and a signature verification unit that verifies a digital signature set for the content code file. The signature verification unit verifies the signature using different pieces of set signature target data between a signature verification process executed in reproducing the content recorded in a ROM disc and a signature verification process executed in reproducing the content recorded in a non-ROM disc other than the ROM disc. The reproducing unit, when signature verification is successfully executed by the signature verification unit, applies the content code stored in the content code file, for which signature verification is successful, to reproduce the content.

19 Claims, 10 Drawing Sheets

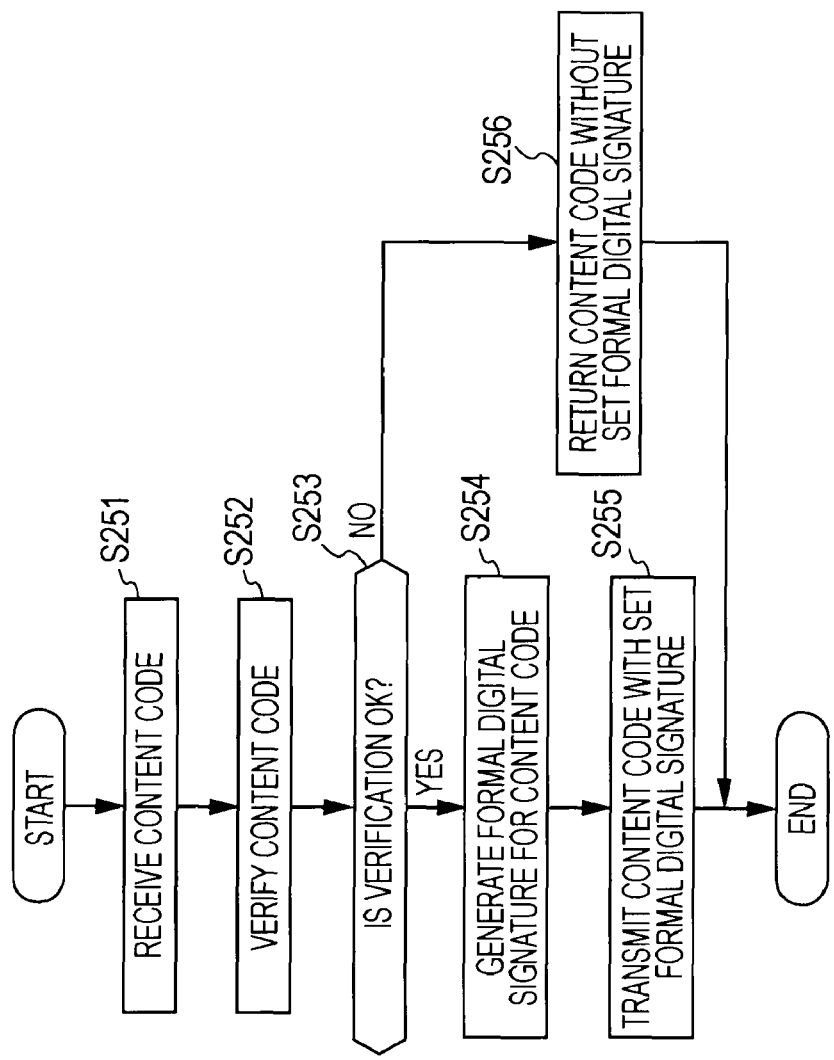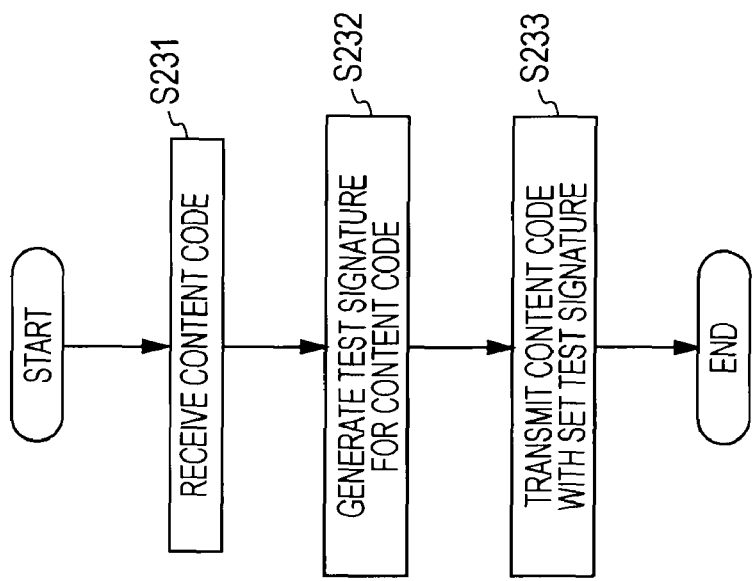

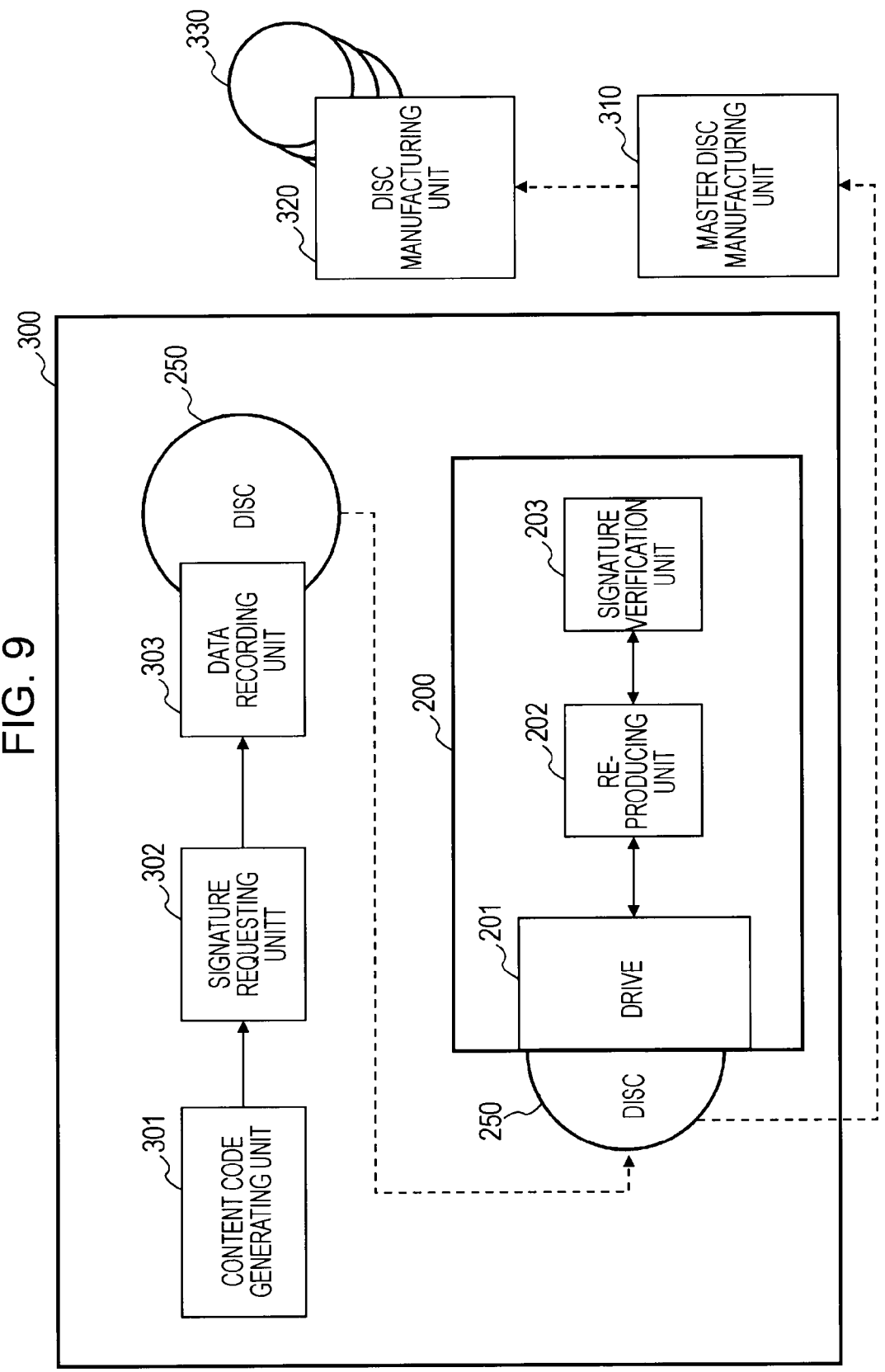

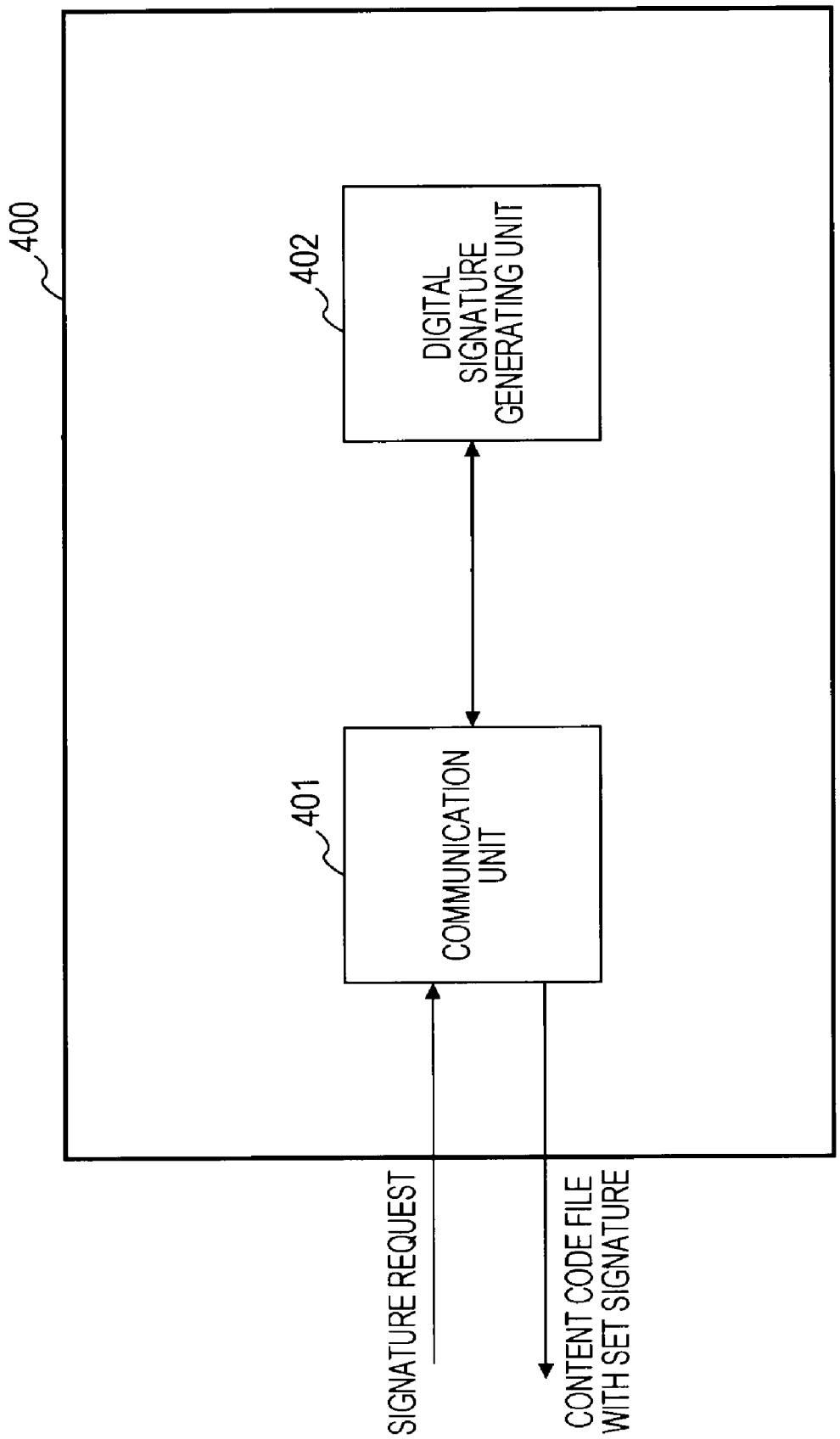

INFORMATION PROCESSING APPARATUS, INFORMATION RECORDING MEDIUM, INFORMATION PROCESSING METHOD, AND INFORMATION PROCESSING PROGRAM

BACKGROUND OF THE INVENTION

1. Field of the Invention

The invention relates to an information processing apparatus, an information recording medium, an information processing method, and an information processing program. More specifically, the invention relates to an information processing apparatus, an information recording medium, an information processing method, and an information processing computer program for carrying out processing using a content code file, which includes an access control program of a content, and the like, which is recorded in an information recording medium together with the content and which is used to reproduce the content.

2. Description of the Related Art

Discs, such as DVDs (Digital Versatile Discs) and Blu-ray Discs (trademark), are used as recording media for various contents, such as movies and music. Copyrights, distribution rights, and the like, of most of these contents recorded in the discs are owned by content creators or distributors, and access control is provided to prevent improper appropriation.

For example, a control program or system is used to prevent unauthorized duplication of a content recorded in a disc or place restrictions on the number of times copied. In addition, there is used an access control method in which an encrypted content is stored in a disc and then a key that can be acquired only by a user or a device with an authorized content access right is set for the content. Note that, for example, Japanese Unexamined Patent Application Publication No. 2003-116100 describes the configuration of a content access control by means of content encryption.

However, even when a content is encrypted, if a cryptographic key leaks, there is a problem that improperly decoded contents leak. International Application Publication No. WO2005/008385 describes an existing configuration that solves the above problem. WO2005/008385 describes a configuration that content data are recorded with part of the content replaced with dummy data to prevent improper reproduction of the content.

When the content replaced with dummy data is reproduced, it may be necessary to replace the dummy data with normal content data. The data conversion utilizes a content code file that contains replacement data for dummy data and a conversion program.

The content code file is recorded in an information recording medium together with the content. The content code file is recorded in the information recording medium, for example, as a file independent of the content. Thus, the content code file may be moved or copied to another information recording medium alone. Thus, it is presumable that an improper content code file is created and used.

To prevent such improper appropriation of a content code file, a digital signature of a third party organization that manages contents is set for a formal content code file. For example, a digital signature is placed on a content code file in a KIC (Key Issuance Center, key management center), and the content code file is recorded in a disc.

When a disc that contains a content and a content code file is inserted in a reproducer for reproducing, the reproducer verifies the signature set for the content code file. Only when the validity of the content code file is verified through the signature verification, it is allowed to reproduce the content using the content code file. This prevents usage of a content code file with no set formal digital signature.

However, there is a problem that the procedure for assigning a digital signature takes time and cost. For example, when it is intended to manufacture and distribute a disc that stores a new content, a content code file corresponding to the new content will be created.

The content code file includes replacement data corresponding to dummy data as described above and a player specific program. Thus, when a new content code file is created, the following processes are repeated. First, reproducing test is executed to check for occurrence of an error in various types of players, and, when an error occurs, the content code file is changed and then reproducing test is executed again.

A device that executes reproducing process with application of a content code file, that is, the above described reproducer, typically checks for validity by verifying the signature of a content code file. Thus, even in the prototyping phase, when the same reproducer as a user device is used, a file with a set formal digital signature is created. As described above, when it may be necessary to recreate a content code file again and again, it may be necessary to request the KIC to assign a signature each time a new file is created. Creating a signature multiple times wastes cost and time.

To cut the above wastes, there is an idea to create a special reproducer for test, which can omit verification of the signature of a content code file to allow reproducing process. However, it is expensive to manufacture such a special reproducer. In addition, in the event that such a special reproducer is improperly distributed, many users may use the improper reproducer, and, therefore, there is a possibility that access control by means of a content code file is invaluable. In such a case, there is a possibility that many contents are improperly reproduced and used to cause a huge loss.

SUMMARY OF THE INVENTION

It is desirable to provide an information processing apparatus, information recording medium, information processing method and information processing program that, for example, in a prototyping phase of a content code file, allow reproducing test using the content code file after temporal verification of a signature without assigning a formal digital signature to the content code file and that are able to prevent reproducing process using an improper content code file.

According to a first embodiment of the invention, an information processing apparatus includes: a reproducing unit that reads, from a disc, a content and a content code file storing a content code that includes at least any one of a program or conversion data applied to a content reproducing process, to execute the content reproducing process; and a signature verification unit that verifies a digital signature set for the content code file, wherein the signature verification unit verifies the signature using different pieces of set signature target data between a signature verification process executed in a process of reproducing the content recorded in a ROM disc and a signature verification process executed in a process of reproducing the content recorded in a non-ROM disc other than the ROM disc, the reproducing unit, when signature verification is successfully executed by the signature verification unit, applies the content code stored in the content code file, for which signature verification is successful, to reproduce the content.

In the information processing apparatus according to the embodiment of the invention, the content code file may include a fixed data area and a non-fixed data area, and the signature verification unit may execute signature verification process on a formal signature that uses the fixed data area and the non-fixed data area as signature target data in reproducing the content recorded in the ROM disc, and may execute signature verification process on a test signature that uses the non-fixed data area as signature target data in reproducing the content recorded in the non-ROM disc.

Furthermore, in the information processing apparatus according to the embodiment of the invention, the content code file may include a prefix that is a fixed value ID indicating that it is a content code, attribute information of the content code, and the content code, and the signature verification unit may execute signature verification process on a formal signature that uses the prefix, the attribute information and the content code as signature target data in reproducing the content recorded in the ROM disc, and may execute signature verification process on a test signature that uses the attribute information and the content code as signature target data in reproducing the content recorded in the non-ROM disc.

In addition, in the information processing apparatus according to the embodiment of the invention, the prefix may be a fixed data area that is formed of fixed bit data.

Moreover, in the information processing apparatus according to the embodiment of the invention, the non-ROM disc may be a data-recordable R-type or RE-type disc.

According to a second embodiment of the invention, a data structure that constitutes a content code file storing a content code that includes at least one of a program or conversion data applied to a content reproducing process includes: a prefix that is an ID indicating that it is a content code, attribute information of the content code, the content code, and a digital signature, wherein the digital signature is a test signature set using the attribute information and the content code as signature target data, and the data structure allows an information processing apparatus to execute signature verification process on a test signature using the attribute information and the content code as signature target data in reproducing the content recorded in a non-ROM disc other than a ROM disc in the information processing apparatus.

According to a third embodiment of the invention, an information recording medium stores a content and a content code file that stores a content code that includes any one of a program or conversion data applied to a content reproducing process, the content code file includes a prefix that is an ID indicating that it is a content code, attribute information that indicates attribute (size, or the like) of the content code, the content code and a digital signature, the digital signature is a test signature set using the attribute information and the content code as signature target data, and the information recording medium allows an information processing apparatus to execute signature verification process on a test signature using the attribute information and the content code as signature target data in reproducing the content recorded in a non-ROM disc other than a ROM disc in the information processing apparatus.

According to a fourth embodiment of the invention, an information processing apparatus includes: a content code generating unit that generates a content code file storing a content code that includes at least any one of a program or conversion data applied to a content reproducing process; a signature requesting unit that executes a request for setting a digital signature for the content code file; a data recording unit that records the content code file with a set signature and a content in a disc; a reproducing unit that reads the content and the content code file from the disc to execute the content reproducing process; and a signature verification unit that verifies a digital signature set for the content code file, wherein the signature verification unit verifies the signature using different pieces of set signature target data between a signature verification process executed in a process of reproducing the content recorded in a ROM disc and a signature verification process executed in a process of reproducing the content recorded in a non-ROM disc other than the ROM disc, the reproducing unit, when signature verification is successfully executed by the signature verification unit, applies the content code stored in the content code file, for which signature verification is successful, to reproduce the content.

In the information processing apparatus according to the embodiment of the invention, the content code file may include a fixed data area and a non-fixed data area, and the signature verification unit may execute signature verification process on a formal signature that uses the fixed data area and the non-fixed data area as signature target data in reproducing the content recorded in the ROM disc, and may execute signature verification process on a test signature that uses the non-fixed data area as signature target data in reproducing the content recorded in the non-ROM disc other than the ROM disc.

In addition, in the information processing apparatus according to the embodiment of the invention, the content code file may include a prefix that is an ID indicating that it is a content code, attribute information indicating attribute of the content code (size of the content code, or the like), and the content code, and the signature verification unit may execute signature verification process on a formal signature that uses the prefix, the attribute information and the content code as signature target data in reproducing the content recorded in the ROM disc, and may execute signature verification process on a test signature that uses the attribute information and the content code as signature target data in reproducing the content recorded in the non-ROM disc other than the ROM disc.

Moreover, in the information processing apparatus according to the embodiment of the invention, the prefix may be a fixed data area that is formed of fixed bit data.

Furthermore, in the information processing apparatus according to the embodiment of the invention, the non-ROM disc may be a data-recordable R-type or RE-type disc.

According to a fifth embodiment of the invention, an information processing apparatus includes: a digital signature generating unit that generates a digital signature for a content code file storing a content code that includes at least any one of a program or conversion data applied to a content reproducing process, wherein the digital signature generating unit executes signature generating process with different pieces of set signature target data depending on a type of signature generating request.

In the information processing apparatus according to the embodiment of the invention, the content code file may include a fixed data area and a non-fixed data area, and the signature generating unit may execute signature generating process that uses the fixed data area and the non-fixed data area as signature target data in response to a formal signature generating request, and may execute signature generating process that uses the non-fixed data as signature target data in response to a test signature generating request.

In addition, in the information processing apparatus according to the embodiment of the invention, the content code file may include a prefix that is an ID indicating that it is a content code, attribute information indicating attribute (size, or the like) of the content code, and the content code, and the signature generating unit may execute signature generating process that uses the prefix, the attribute data and the content code as signature target data in response to a formal signature generating request, and may execute signature generating process that uses the attribute data and the content code as signature target data in response to a test signature generating request.

According to a sixth embodiment of the invention, an information processing method executed in an information processing apparatus, includes the steps of: executing content reproducing process by reading, from a disc, a content and a content code file storing a content code that includes at least any one of a program or conversion data applied to the content reproducing process by a reproducing unit; and verifying a digital signature set for the content code file by a signature verification unit, wherein, when the digital signature is verified, the signature is verified using different pieces of set signature target data between a signature verification process executed in a process of reproducing the content recorded in a ROM disc and a signature verification process executed in a process of reproducing the content recorded in a non-ROM disc other than the ROM disc, and, when the content reproducing process is executed, and when signature verification is successfully executed by the signature verification unit, the content code stored in the content code file, for which signature verification is successful, is applied to reproduce the content.

According to a seventh embodiment of the invention, a disc manufacturing method executed in a disc manufacturing apparatus, includes the steps of: generating a content code file storing a content code that includes at least any one of a program or conversion data applied to a content reproducing process by a content code generating unit; recording a content and a content code file with a set test signature, which is a digital signature, for the content code file in a non-ROM disc, other than a ROM disc, by a data recording unit; executing signature verification process on the test signature of the content code file by a signature verification unit; executing content reproducing process by reading the content and the content code file with the set test signature, which are recorded in the non-ROM disc, from the disc; when the content reproducing process is successfully executed by reading the content and the content code file with the set test signature, which are recorded in the non-ROM disc, from the disc, recording the content and the content code file with a set formal signature, that uses a data area different from the test signature as a signature target, as a digital signature for the content code file by the data recording unit; executing signature verification process on the formal signature of the content code file by the signature verification unit; executing content reproducing process by reading the content and the content code file with the set formal signature, which are recorded in the ROM disc, from the disc; when the content reproducing process is successfully executed by reading the content and the content code file with the set formal signature, which are recorded in the ROM disc, from the disc, manufacturing a master disc that contains the content and the content code file with the set formal signature as recording data by a master disc manufacturing unit; and manufacturing a disc by applying the manufactured master disc by a manufacturing unit.

In addition, in the disc manufacturing method according to the embodiment of the invention, the content code file may include a fixed data area and a non-fixed data area, when the content and the content code file are recorded in the non-ROM disc, the content and the content code file with the set test signature that uses the non-fixed data area as signature target data may be recorded in the non-ROM disc other than the ROM disc, and, when the content and the content code file are recorded in the ROM disc, the content and the content code file with the set formal signature that uses the fixed data area and the non-fixed data area as signature target data may be recorded in the ROM disc.

Furthermore, in the disc manufacturing method according to the embodiment of the invention, the non-ROM disc may be a data-recordable R-type or RE-type disc.

According to an eighth embodiment of the invention, a program for causing an information processing apparatus to execute information processing, includes the steps of: executing content reproducing process by reading, from a disc, a content and a content code file storing a content code that includes at least any one of a program or conversion data applied to the content reproducing process by a reproducing unit; and verifying a digital signature set for the content code file by a signature verification unit, wherein, when the digital signature is verified, the signature is verified using different pieces of set signature target data between a signature verification process executed in a process of reproducing the content recorded in a ROM disc and a signature verification process executed in a process of reproducing the content recorded in a non-ROM disc other than the ROM disc, and, when the content reproducing process is executed, and when signature verification is successfully executed by the signature verification unit, the content code stored in the content code file, for which signature verification is successful, is applied to reproduce the content.

Note that the program according to the embodiments of the invention may be, for example, provided to a general-purpose system that is able to execute various programs and codes in a computer readable format through a recording medium or a communication medium. By providing the above programs in a computer readable format, processes in accordance with the programs may be implemented on a computer system.

Further aspects, features and advantages of the invention will become apparent from further detailed description based on embodiments of the invention and the accompanying drawings. Note that the system in the present specification is a logically integrated configuration of a plurality of devices, and is not limited to the one that a device of each configuration is placed in the same casing.

With the configuration according to the embodiment of the invention, in creating or testing a content code that includes at least any one of a program or conversion data applied to a content reproducing process, a process of verifying a signature set for the content code file is executed as in the case of a general user reproducer, and, when the signature verification is successful, a content reproducing test is conducted. In an initial reproducing test, a content code file with a test signature set for a data area different from that of a formal signature is recorded in an R- or RE-type disc to carry out signature verification or reproducing test. After that, the content code file with a set formal signature is recorded in a ROM disc for test. With the above configuration, a reproducing test including signature verification is also conducted on an R- or RE-type disc, and efficient content code generation and disc manufacturing process may be implemented without repeatedly assigning a formal signature, which causes an increase in cost, multiple times.

BRIEF DESCRIPTION OF THE DRAWINGS

FIG. 7A and FIG. 7B are flowcharts, each of which illustrates a sequence of a process of setting a signature for a content code file according to the embodiment of the invention;

FIG. 9 is a view that shows an example of the configuration of devices that test a content code and manufacture a disc according to the embodiment of the invention; and FIG. 10 is a view that shows the configuration of an information processing apparatus, which serves as a control server, that assign test signature and formal signature according to the embodiment of the invention.

DESCRIPTION OF THE PREFERRED EMBODIMENTS

Hereinafter, an information processing apparatus, information recording medium, information processing method and information processing program according to an embodiment of the invention will be described in detail with reference to the accompanying drawings.

Figure 1:
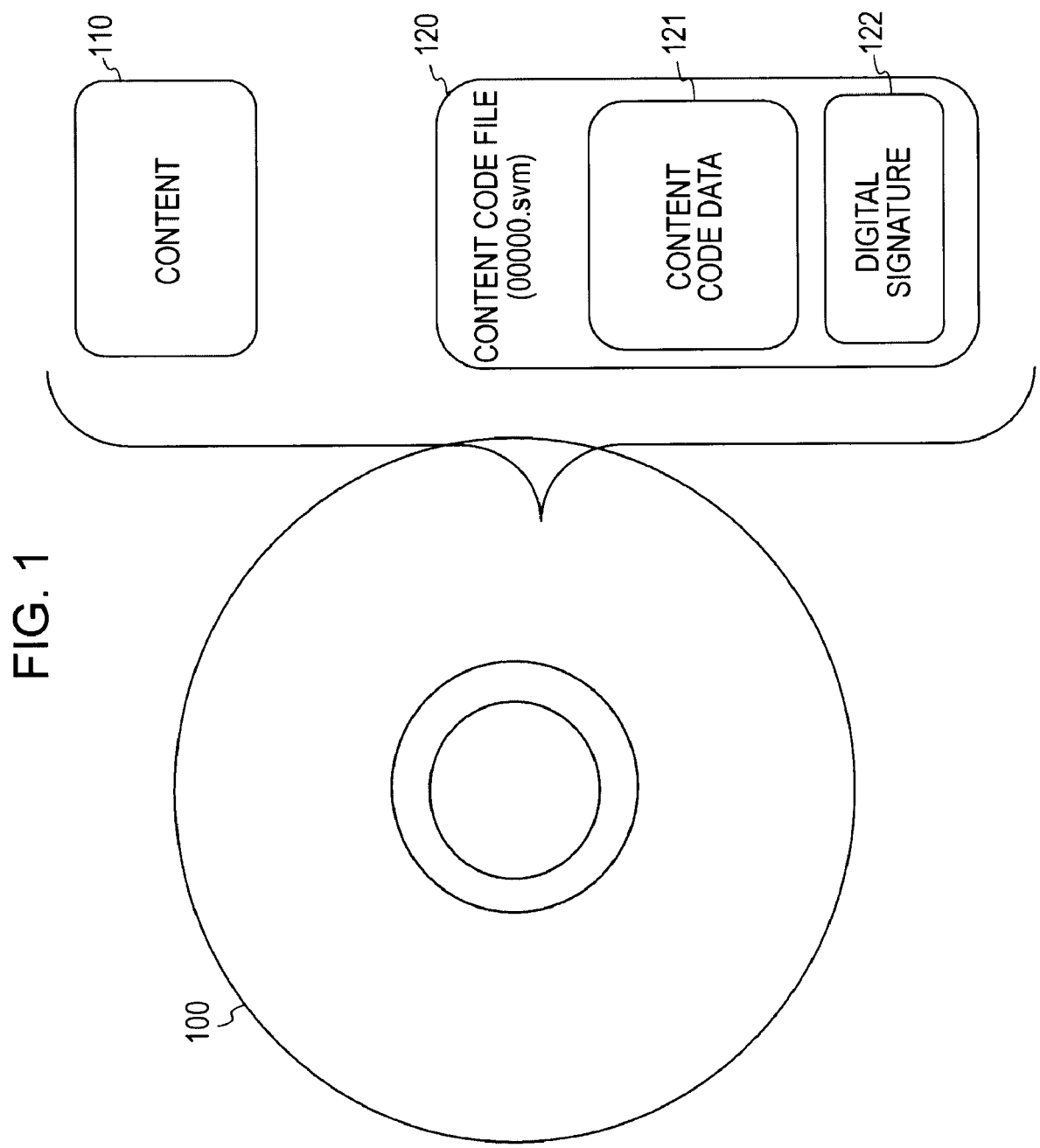
FIG. 1 is a view that illustrates an example of the configuration of data stored in a disc.

First, data stored in the information recording medium will be described. FIG. 1 is a view that shows an example of data stored in a disc (Blu-ray Disc (trademark)), which is an information recording medium. A disc 100 shown in FIG. 1 is an example of a content-stored disc in conformity with AACS (Advanced Access Content System) standard.

The disc 100 stores a content 110 and a content code file 120 as recording data. Note that, other than the above, the disc in conformity with the AACS standard also contains various pieces of data, such as a key information file applied for decoding the content 110; however, description of pieces of data that are not directly related to description of the configuration according to the embodiment of the invention is omitted.

The content 110 is, for example, formed of an AV (Audio Visual) stream of animated content, such as a HD (High Definition) movie, which is high-definition dynamic image data, a game program in a format prescribed in a specific standard, an image file, audio data, and text data, and the like. These contents are specific AV format standard data, and are stored in accordance with a specific AV data format. Specifically, for example, the contents are stored in accordance with a Blu-ray disc ROM standard format as Blu-ray disc ROM standard data.

For example, in order to implement different access controls for respective segment contents, the contents 110 are stored so that different keys (a CPS unit key or a unit key (or it may also be called a title key)) are allocated to respective segment contents and respectively encrypted. A unit to which one unit key is allocated is called a content management unit (CPS unit).

The content 110 is set as broken data in which part of component data are replaced with data different from proper content data, and the content is not correctly reproduced only through decoding. When the content is reproduced, it may be necessary that the broken data are replaced with proper data using content code data 121, including proper content data, that are included in the content code file 120.

The content code file 120 stores the content code data 121 that at least include any one of a program used in reproducing the content 110 or replacement data for broken data, included in the content 110.

The content code file 120 has the assigned content code data 121 and a digital signature 122. The content code data 121 is formed of data and a program for replacing broken data with a proper content. The digital signature 122 is used to verify the validity of the content code file 120 and check for tampering. The digital signature 122 is set as a signature to which a private key of a content management administration, for example, a private key of the KIC, that manages contents.

The reproducer that accesses a content first verifies the digital signature 122 of the content code file 120 to determine whether the content code file 120 is a proper file with no tampering. When the determination is affirmative, the content code 121 included in the content code file 120 is used to replace the component data of the content 110, thus reproducing the content.

Note that FIG. 1 shows the content 110 and the content code file 120 one by one; however, the disc 100 is able to contain a plurality of contents and a plurality of content code files. For example, when one of contents is being reproduced, reproducing process is executed using a content code file corresponding to the content.

As shown in FIG. 1, a disc that contains a content in advance and is not recordable is called a ROM disc. A ROM disc in regard to Blu-ray Disc (trademark) is called a BD-ROM.

In the case of reproducing the content recorded in the BD-ROM disc, signature verification of the content code file 120 is executed. Only when it may be determined that the content code file 120 is a proper file with no tampering, the content code 121 included in the content code file 120 is used to replace the component data of the content 110 to reproduce the content.

Figure 2:
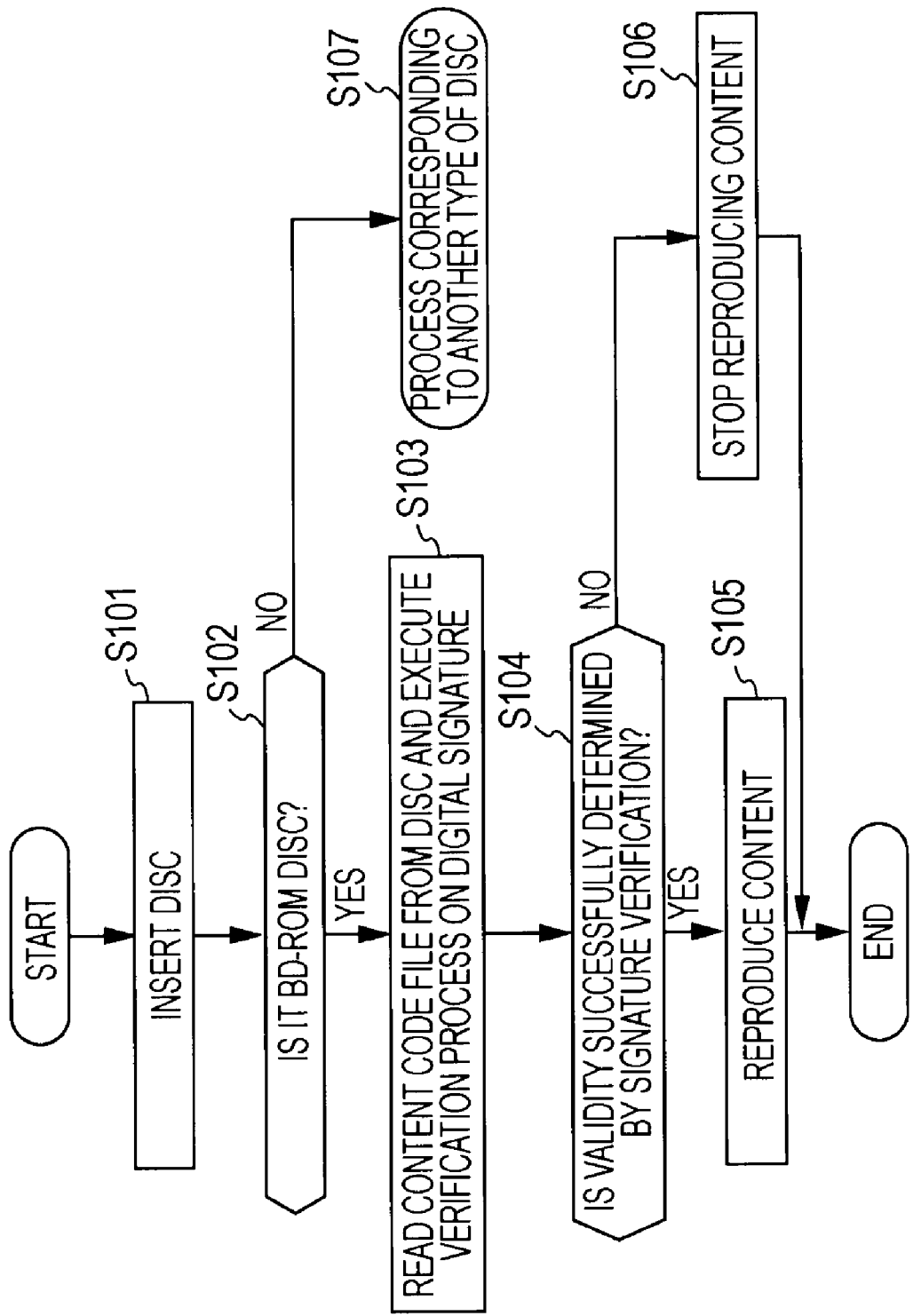
FIG. 2 is a flowchart that illustrates a sequence of content reproducing process to which a content code is applied.

FIG. 2 is a flowchart that illustrates a process sequence when the reproducer reproduces a content recorded in the BD-ROM disc.

First, in step S101, the information processing apparatus (reproducer) inserts a disc into a drive. The disc contains a content and a content code file as shown in FIG. 1.

In step S102, the information processing apparatus determines the type of the disc inserted in the apparatus. The disc type determination, such as recording type of the disc, for example, whether it is a BD-ROM, is performed by detecting a ROM mark, or the like. When the disc is not a BD-ROM, in step S107, the disc is not subjected to a process corresponding to the BD-ROM but subjected to a process corresponding to the inserted disc.

When it is determined in step S102 that the disc is a BD-ROM, in step S103, the content code file is read from the disc to verify a digital signature. As described above, the content code file has a set digital signature of the content management administration in order to verify the validity of the content code file. A private key of the content management administration is applied to a hash value (sha1-hasf) for the component data of the content code data, and the digital signature is assigned in accordance with a signature algorithm compliant with FIPSPUB186-2.

The information processing apparatus (reproducer) applies a public key of the content management administration to verify the signature. In step S104, it is determined whether verification of the signature is successful. That is, it is determined whether it is verified that the content code file is a proper file with no tampering. When it fails to verify the signature, that is, when it is determined that the validity of the content code file is not verified, in step S106, access to the content code file is prohibited to stop reproducing the content.

On the other hand, in step S104, when it succeeds in verifying the signature, that is, when the validity of the content code file is verified, in step S105, access to the content code file is permitted to reproduce the content using the program and replacement data stored in the content code file.

In this way, when the content are reproduced, the validity of the content code file is verified, and the content code file of which the validity is verified is used.

The content code file is created in correspondence with the content and recorded in the disc. The content code file includes replacement data, a program, and the like, applied to reproduce the content.

Thus, when a disc that stores a new content is manufactured, it may be necessary that, at the stage before manufacturing the disc, a content code file corresponding to the new content is prototyped, a reproducing test is conducted, and then it is determined whether reproducing is performed with no error.

However, the reproducing process in a general reproducer is executed in accordance with the flowchart shown in FIG. 2. When the content is reproduced, the validity of the content code file is checked, and the content code file of which the validity is verified is used. Thus, because a content code file with no set signature is regarded as an improper file, it is difficult to execute a reproducing test.

It is expensive to manufacture a special device that is able to execute reproducing without signature verification, and there is a possibility that the special device is distributed and then improper access to a content may spread widely. Thus, even in a test during manufacturing, it is desirable to conduct a test using a file with a set signature.

However, in the flowchart shown in FIG. 2, the steps S103 to S105 are executed only when the disc is a BD-ROM. Thus, it is possible to execute a reproducing test by writing a new content and a test content code file in a disc other than the BD-ROM, such as a recordable BD-R (recordable disc) and a recordable BD-RE (rewritable disc).

However, in this case as well, eventually, it may be necessary to record a content and a content code file in a ROM disc (BD-ROM) to conduct a reproducing test. This is because a reproducing sequence in the BD-ROM is prescribed as a special reproducing sequence, and an error may occur even with a content code that does not cause an error in the BD-R or the BD-RE.

Figure 3:
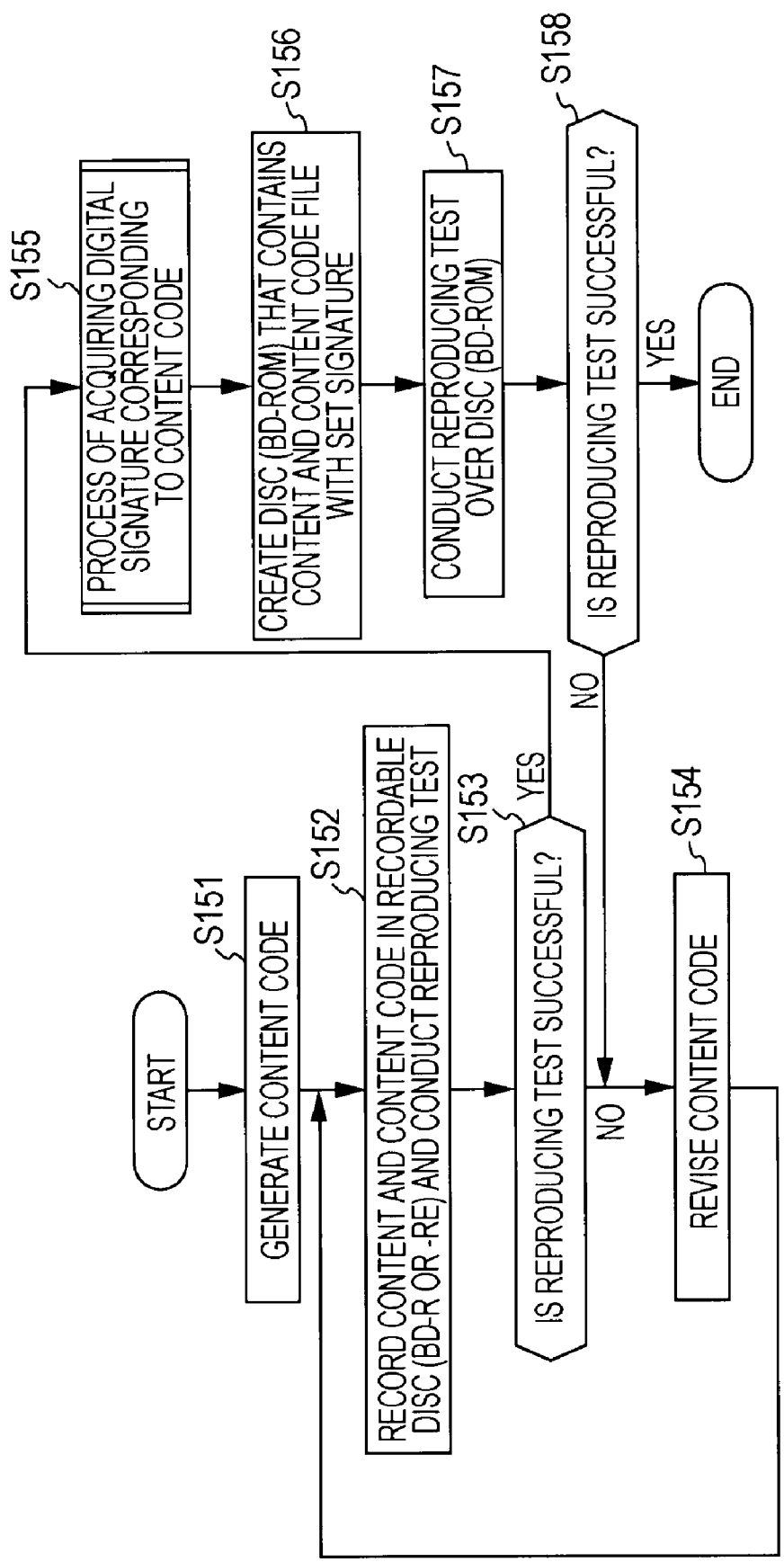
FIG. 3 is a flowchart that illustrates a sequence of prototyping and testing of a content code.

FIG. 3 is a flowchart that illustrates a typical sequence when a content code file is prototyped and a reproducing test is conducted. This process is carried out by a manufacturer of a content and a content code file, in a disc factory, or the like, before manufacturing a disc.

In step S151, a content code corresponding to a new content is created. Subsequently, in step S152, the content and the content code are recorded in a recordable disc (BD-R/RE) to execute a reproducing test.

When the reproducing test ends in failure, the content code is revised in step S154, and the process returns to step S152 to repeat a reproducing test using a BD-R or a BD-RE.

In this reproducing test, when reproducing is performed with no error and the reproducing test is successful, the content code file that includes the content code with a set signature is completed and written into a BD-ROM. Thereafter, a final test is conducted. This process is a process in step S155 and the following steps.

In step S155, a process of acquiring a digital signature corresponding to the content code is performed. The digital signature is a digital signature of the content management administration as described above. In step S155, the created content code is transmitted to the content management administration to request a signature, and receives the content code with a set signature.

Figure 4:
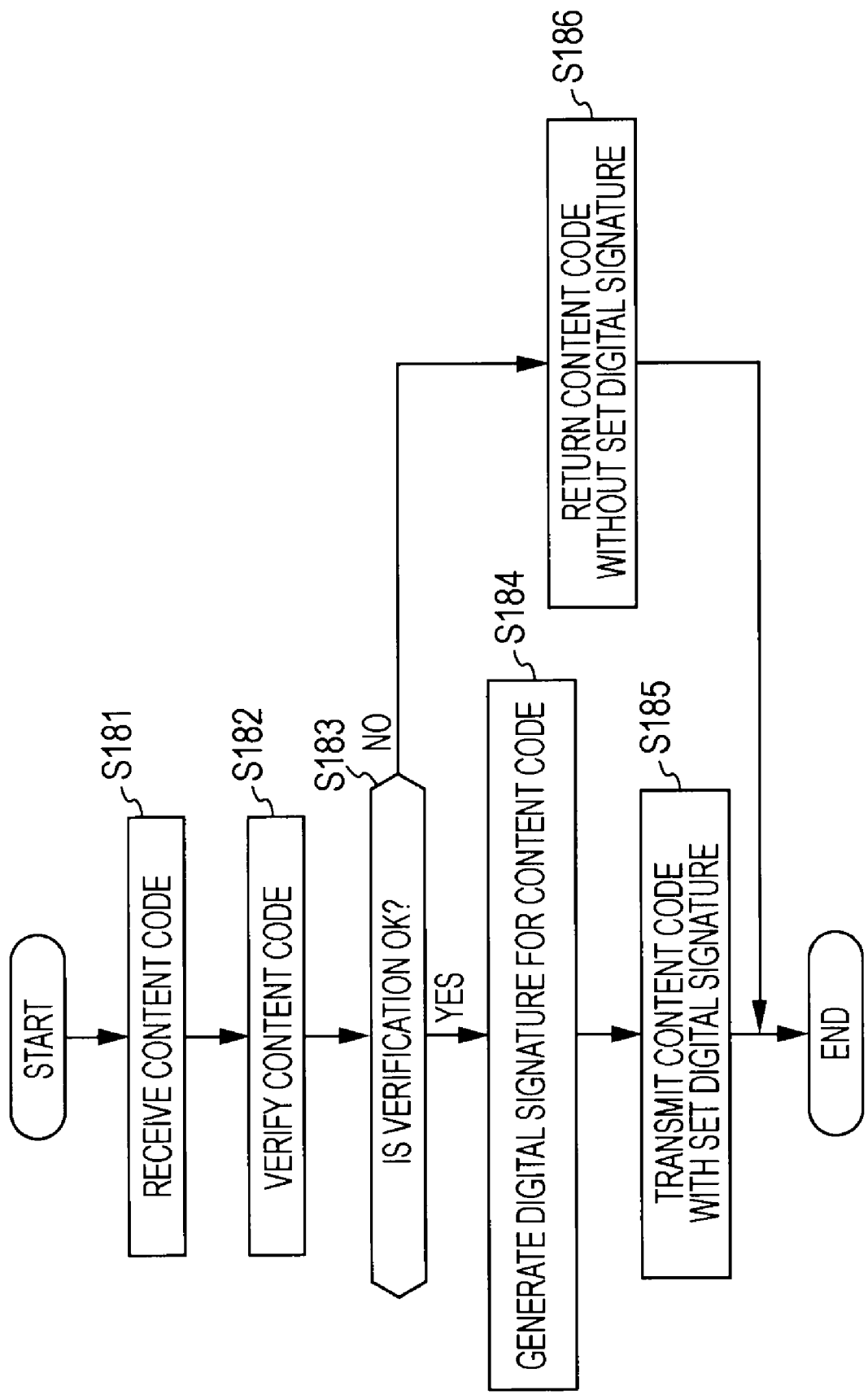
FIG. 4 is a flowchart that illustrates a sequence of a process of setting a signature to a content code file.

The detailed sequence of the process in step S155 will be described with reference to the flowchart shown in FIG. 4. FIG. 4 is a process sequence at a side where a signature is set for a content code. That is, the process sequence is a process executed at the content management administration.

As a server of the content management administration receives the content code in step S181, the server verifies in step S182 whether the received content code has a format in accordance with the standard. When there is a problem, the determination in step S183 is negative. Then, in step S186, the content code is returned without setting a digital signature.

When the verification result of the content code is no problem, in step S184, a digital signature is set for the content code. As described above, a private key of the content management administration is applied to a hash value (sha1-hasf) for the component data of the content code data, and the digital signature is generated in accordance with a signature algorithm compliant with FIPSPUB186-2. After that, in step S185, the content code with the set digital signature is transmitted to the source.

In this way, a digital signature is placed on a content code. However, this process takes cost and time as described above.

Referring back to the flowchart shown in FIG. 3, the description will be continued. In step S155, after the digital signature corresponding to the content code is acquired in accordance with the flowchart shown in FIG. 4, the process proceeds to step S156.

In step S156, a disc (BD-ROM) that contains the content and the content code file with a set signature is created. Then, in step S157, a reproducing test is conducted using the disc (BD-ROM) that contains the content and the content code file with the set signature. In this reproducing test, the signature of the content code file is verified, and the content code file that succeeds in signature verification is applied to execute content reproducing process. That is, the reproducing process is executed in accordance with the flowchart shown in FIG. 2.

In this reproducing test, when the reproducing process is successful with no reproducing error (Yes in S158), the process ends. Then, a large number of ROM discs, each of which contains the content and the content code file, are manufactured and distributed.

However, in this reproducing test, when a reproducing error occurs and the reproducing process ends in failure (No in S158), the content code is revised in step S154, and, in addition, the process returns to step S152 to repeat a reproducing test using a BD-R or a BD-RE.

When the reproducing process is successful in the reproducing test using the BD-R or the BD-RE, the process of acquiring a signature is executed again, and then the writing process is performed over the ROM disc to conduct a reproducing test with the ROM disc. As the above processes are repeated, the process of creating a ROM disc and the process of acquiring a signature waste large amounts of cost and time.

The embodiment of the invention provides a configuration that does not produce such wastes. The sequence when a process of prototyping a content code file and a reproducing test are performed according to the embodiment of the invention will be described with reference to the flowchart shown in FIG. 5. This process is carried out by a manufacturer of a content and a content code file, in a disc factory, or the like, before manufacturing a disc.

In step S201, a content code corresponding to a new content is created. Subsequently, in step S202, a test signature is set for the generated content code.

In process according to the embodiment of the invention, two types of signatures, that is, (a) test signature and (b) formal signature, are used as signatures for the content code.

The test signature is used at the prototyping phase of a content code. The formal signature is set for a content code file that is recorded in a disc, which is an actual product.

Both the test signature and the formal signature are generated by applying a private key of the content management administration, and a signature is generated by requesting the content management administration.

However, the test signature and the formal signature are placed on different component data as a signature target. An example of setting signature target data of each of the test signature and the formal signature will be described with reference to FIG. 6.

Figure 6:
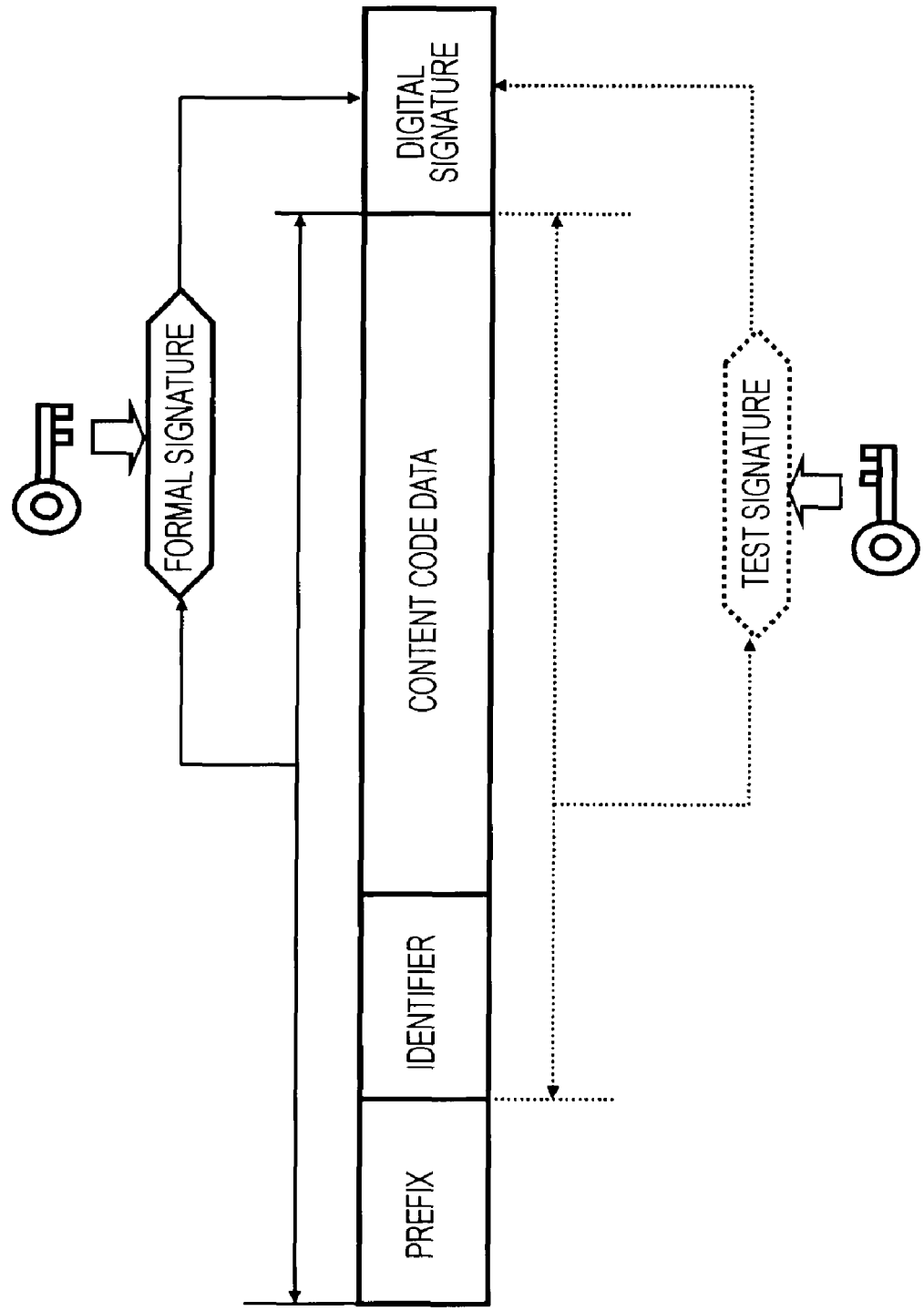
FIG. 6 is a view that illustrates an example of setting a signature for a content code file according to the embodiment of the invention.

FIG. 6 shows the component data of a content code file. As shown in FIG. 6, the content code file is formed of pieces of data, that is, (1) prefix (Prefix), (2) attribute information identifier (Identifier) (3) content code data (Content code data), and (4) digital signature (Signature).

The prefix (Prefix) is an ID of a fixed value indicating a content code, and is fixed 8-byte data. The identifier (Identifier) is information that indicates the attribute (size, and the like) of the content code. The content code data (Content code data) are substantial data, such as a conversion program and conversion data, used when a content is reproduced. The digital signature (Signature) is a signature generated by applying a private key of the content management administration.

In this way, the content code file includes a prefix (Prefix), which is a fixed data area, and an identifier (Identifier) and content code data (Content code data), which are non-fixed data areas.

As shown in the drawing, the formal signature is generated for the pieces of data, that is, (1) prefix (Prefix), (2) identifier (Identifier), and (3) content code data (Content code data), as a signature target. A hash value (sha1-hasf) for the pieces of data (1) to (3) is generated, and a private key of the content management administration is applied to the hash value to generate a formal digital signature in accordance with a signature algorithm compliant with FIPSPUB186-2.

On the other hand, as shown in the drawing, the test signature is generated for the pieces of data, that is, (2) identifier (Identifier) and (3) content code data (Content code data), as a signature target. A hash value (sha1-hasf) for the pieces of data (2) and (3) is generated, and a private key of the content management administration is applied to the hash value to generate a test signature in accordance with a signature algorithm compliant with FIPSPUB186-2. That is, the prefix, which is the ID of a fixed value, is omitted, while the identifier that indicates a data size, or the like, and that is varied for each content code is used as a signature target and protected by a signature although it is a temporary signature.

Any of the formal signature and the test signature uses the same key and algorithm for signature; however, different pieces of signature target data are set.

Furthermore, when the formal signature is set, the content code file, which is the data on which a signature is placed in the content management administration, is verified in detail to determine whether a format, or the like, conforms to the regulations, and then a signature is placed. However, when the test signature is set, the content code file, which is the data on which a signature is placed in the content management administration, is not verified in detail but a signature is placed. In this way, the test signature simplifies the procedure for generating a signature.

Note that, an example of setting a signature shown in FIG. 6 shows that the formal signature uses the entire content code file including the prefix (Prefix) as signature setting target data, and the test signature uses the content code file, excluding the prefix (Prefix), as signature setting target data; however, another setting is also possible. That is, the test signature and the formal signature use different data fields as signature target data to enable various settings. For example, the test signature uses a non-fixed data area that does not include a fixed data area as a signature target, and the formal signature uses a fixed data area and a non-fixed data area as a signature target.

Referring back to FIG. 5, the sequence when a process of prototyping a content code file and a reproducing test are performed according to the embodiment of the invention will be continuously described. In step S201, a content code corresponding to a new content is created, and then, in step S202, a test signature is set for the generated content code.

The detailed sequence of setting a test signature for the content code in step S202 will be described with reference to the flowchart shown in FIG. 7A. FIG. 7A and FIG. 7B respectively show flowcharts. FIG. 7A shows a test signature generating sequence. FIG. 7B shows a formal signature generating sequence. FIG. 7A and FIG. 7B show signature generating sequences, and are executed in a processing sequence executed in the content management administration.

Figure 5:
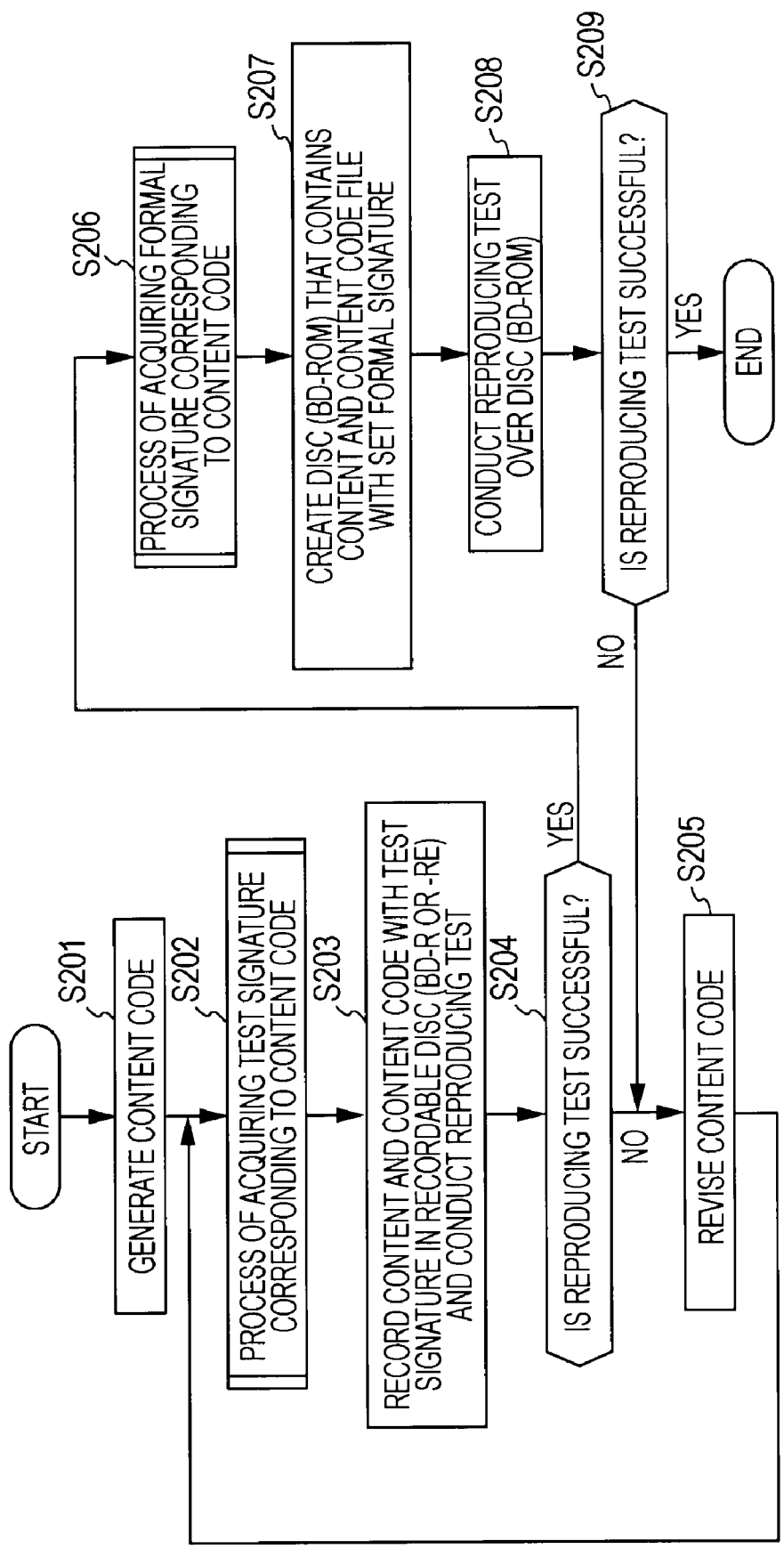
FIG. 5 is a flowchart that illustrates a sequence of prototyping and testing a content code according to an embodiment of the invention.

In step S202 of the flowchart in FIG. 5, the process according to the flowchart shown in FIG. 7A is executed in the content management administration.

As the server of the content management administration receives the content code in step S231, a digital signature is set for the content code in step S232, and then, in step S233, transmits the content code with a set test signature to the source.

In this case, the server of the content management administration does not verify the received content code in detail but sets a test signature. That is, detailed verification, such as verification of the format of a content code which will be executed at the time of setting a formal signature, is omitted, and a test signature is generated. Note that as described with reference to FIG. 6 above, the test signature sets different data fields from the formal signature as signature target data.

For example, as shown in FIG. 6, the test signature generates a hash value (sha1-hasf) for pieces of data, that is, identifier (Identifier) and content code data (Content code data), and applies a private key of the content management administration to the hash value to generate a test signature in accordance with a signature algorithm compliant with FIPSPUB186-2.

Note that, when the apparatus that is executing process of prototyping a content code transmits a content code to the server of the content management administration, the apparatus provides the server with a notification that indicates whether it is a request for a test signature or a request for a formal signature at the time of transmitting the content code or in advance. The server of the content management administration determines on the basis of the notification whether the received content code is data for requesting a test signature or data for requesting a formal signature.

When it is determined on the basis of the notification that it is a request for a test signature, the server of the content management administration executes the process according to the flowchart shown in FIG. 7A, whereas, when it is determined that it is a request for a formal signature, the server executes the process according to the flowchart shown in FIG. 7B.

Referring back to FIG. 5, the sequence when a process of prototyping a content code file and a reproducing test are performed according to the embodiment of the invention will be continuously described. In step S202, the process of setting a test signature for the content code is executed in accordance with the flowchart shown in FIG. 7A.

When the apparatus receives the content code with the set test signature, in step S203, the content and the content code file with the set test signature are recorded in a recordable disc (BD-R or -RE) to carry out a reproducing test, and then in step S204, it is determined whether the reproducing test is successful. That is, the content is reproduced using the content code file with the set test signature, and it is verified whether the content is reproduced with no error.

Note that the reproducing test in step S203 may be carried out using a device similar to a typical user device. That is, (a) reading the content code file, (b) verifying the signature set for the content code file, and (c) reproducing the content using the content code recorded in the content code file that succeeds in signature verification, these processes (a), (b), and (c) are sequentially executed. However, in verifying the signature, the signature target data are different from those of the formal signature as described with reference to FIG. 6, so the process of verifying the signature is executed on the different data area.

When it is determined in step S204 that the reproducing test ends in failure, the content code is revised in step S205. Then, the process returns to step S202 to set a test signature again, and in step S203, the reproducing test is repeated using a BD-R or a BD-RE.

In this reproducing test, when the content is reproduced with no error and, therefore, the reproducing test is successful, a content code file that includes a content code with a set formal signature is completed and written into a BD-ROM to conduct a final test. This process is performed in step S206 and the following steps.

In step S206, a process of acquiring a formal digital signature corresponding to the content code is performed. As described with reference to FIG. 6 above, the formal digital signature is a digital signature of the content management administration and sets data fields different from those of the test signature as the signature target data.

That is, as described with reference to FIG. 6, a private key of the content management administration is applied to a hash value (sha1-hasf) corresponding to data, that is, (1) prefix (Prefix), (2) identifier (Identifier), and (3) content code data (Content code data), to generate a formal digital signature in accordance with a signature algorithm compliant with FIPS-PUB186-2.

In step S206, the created content code is transmitted to the content management administration to request for a formal signature, and the content code with a set formal signature is received.

The detailed sequence of the process in step S206 will be described with reference to the flowchart shown in FIG. 7B. FIG. 7B shows a process executed in the content management administration.

Note that, as described in the sequence of the test signature shown in FIG. 7A, the apparatus executing a process of prototyping a content code transmits a content code to the server of the content management administration, the apparatus provides a notification that indicates whether it is a request for a test signature or a request for a formal signature at the time of transmitting the content code or in advance. The server of the content management administration determines on the basis of the notification whether the received content code is data for requesting a test signature or data for requesting a formal signature. When it is determined on the basis of the notification that it is a request for a formal signature, the server of the content management administration executes the process according to the flowchart shown in FIG. 7B.

As the server of the content management administration receives the content code in step S251, the server verifies in step S252 whether the received content code has a format in accordance with the standard. When there is a problem, the determination in step S253 is negative. Then, in step S256, the content code is returned without setting a digital signature.

When the verification result of the content code is no problem, in step S254, a digital signature is set for the content code. As described with reference to FIG. 6, the private key of the content management administration is applied to a hash value (sha1-hasf) corresponding to data, that is, prefix (Prefix), identifier (Identifier) and content code data (Content code data), to generate a formal digital signature in accordance with a signature algorithm compliant with FIPS-PUB186-2.

Next, in step S255, the content code with the set formal digital signature is transmitted to the source. In this way, a formal signature is placed on the content code.

Referring back to the flowchart shown in FIG. 5, the description will be continued. In step S205, after the formal digital signature corresponding to the content code is acquired in accordance with the flowchart shown in FIG. 7B, the process proceeds to step S207.

In step S207, a disc (BD-ROM) that contains the content and the content code file with the set formal signature is created. Then, in step S208, a reproducing test is conducted using the disc (BD-ROM) that contains the content and the content code file with the set formal signature. In this reproducing test, the signature of the content code file with the set formal signature is verified, and the content code file that succeeds in signature verification is applied to execute content reproducing process. That is, the reproducing process is executed in accordance with the flowchart shown in FIG. 2.

In this reproducing test, when the reproducing process is successful with no reproducing error (Yes in S209), the process ends. Then, a large number of ROM discs, each of which contains the content and the content code file, are manufactured and distributed.

However, in this reproducing test, when a reproducing error occurs and the reproducing process ends in failure (No in S208), the content code is revised in step S205, and, in addition, the process returns to step S202 to repeat a reproducing test using a BD-R or a BD-RE.

In the process in the flowchart shown in FIG. 5, the signature is verified in the reproducing test using the BD-R or the BD-RE as in the case of the reproducing test using the BD-ROM. That is, (a) reading the content code file, (b) verifying the signature set for the content code file, and (c) reproducing the content using the content code recorded in the content code file that succeeds in signature verification, these processes (a), (b), and (c) are sequentially executed. These processes are the same process sequence as the processes performed on the BD-ROM.

In this way, the sequence of the reproducing test executed on the BD-R or the BD-RE is set as a sequence similar to that of the test on the BD-ROM.

In the sequence described with reference to FIG. 3 above, the test using the BD-R or the BD-RE does not execute signature verification, or the like, so the sequence is largely different from that of the reproducing test on the BD-ROM, in which it may be necessary to execute signature verification. Thus, the content is successfully reproduced in the reproducing test using the BD-R or the BD-RE, the probability of occurrence of an error in the reproducing test after being recorded in the BD-ROM is relatively high. That is, because it may be necessary to create a mother disc, a stamper, and the like, for creating a ROM disc, the ROM disc is created at a high cost.

In contrast, in the sequence shown in FIG. 5, the sequence of the reproducing executed on the BD-R or the BD-RE, for which it is not necessary to create a mother disc or a stamper, is set as a sequence similar to that of the test on the BD-ROM. Thus, when no error occurs in the reproducing test on the BD-R and the BD-RE that are created as a test, the probability of occurrence of an error in the test on the BD-ROM may be remarkably reduced. In addition, if an error occurs in the reproducing test on the BD-R or -RE disc created as a test, only a general recording drive is used to record a recreated content code to enable creating a test disc after revision. Thus, it is possible to conduct a test at a lower cost than a test by creating a ROM disc.

Thus, it is less likely that the reproducing test on the BD-ROM ends in failure and it is determined to be negative in step S158 in the flowchart shown in FIG. 5. That is, there is a lower possibility that an error occurs at the time of the test on the BD-ROM to proceed to revision of the content code. As a result, in many cases, a request for a formal signature is only once.

In the sequence according to the embodiment of the invention, a reproducing test executed on a BD-R or a BD-RE and a request for test signature may be repeated multiple times, whereas there is a lower possibility that an error occurs in the process after the reproducing test executed on the BD-R or the BD-RE is successful. That is, in most cases, a process of setting a formal signature may be reduced to only once.

The process of setting a test signature is a simple procedure that takes little cost and time. In contrast, the process of setting a formal signature includes a process such as a formal check in the administration server, so the process takes cost and time.

In the process sequence according to the embodiment of the invention, a test signature may be repeated multiple times; however, the process of setting a formal signature that takes cost and time may be completed once. Thus, an increase in efficiency and cost reduction may be implemented as a whole.

Figure 8:
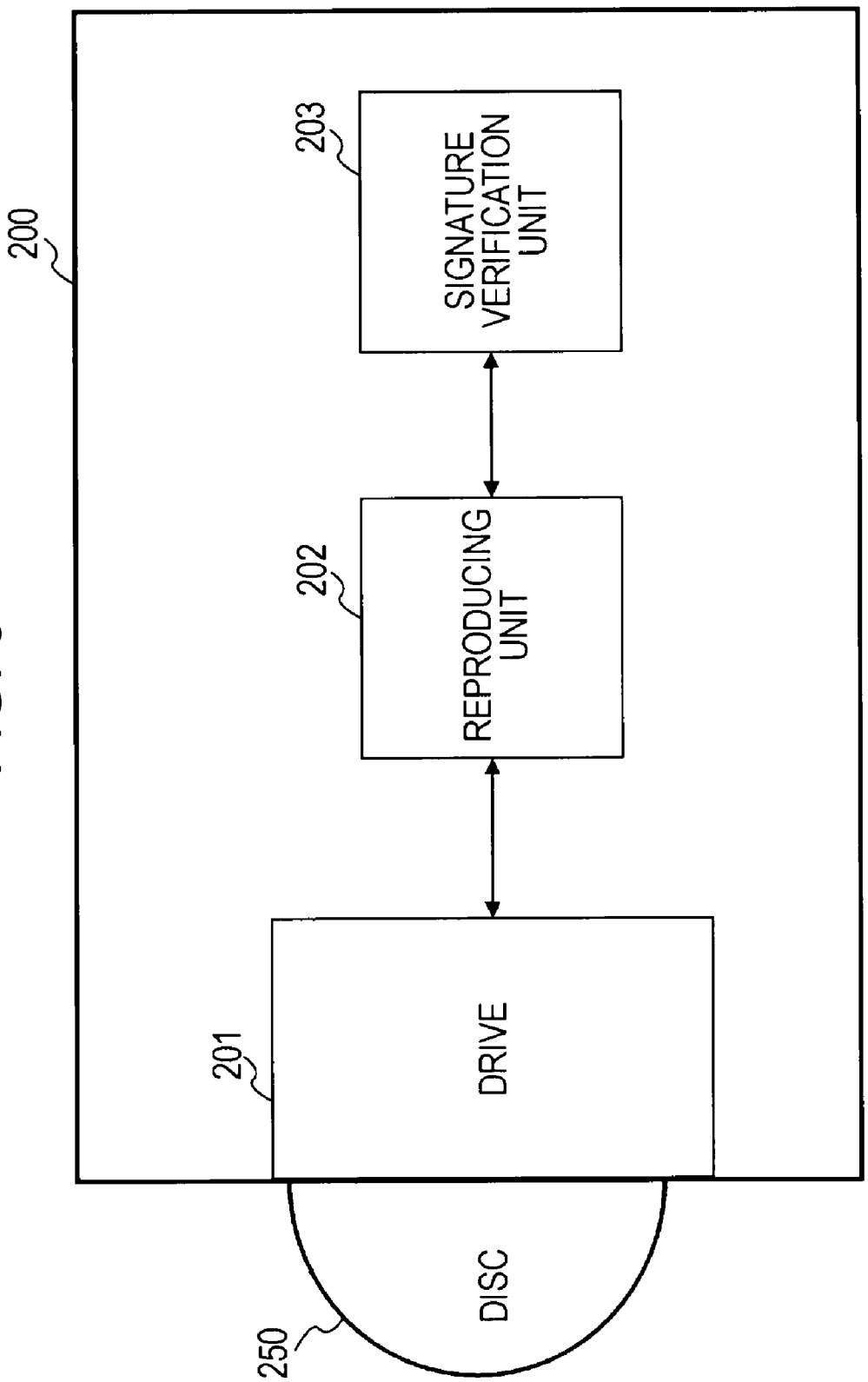
FIG. 8 is a view that illustrates an example of the configuration of an information processing apparatus that reproduces a content according to the embodiment of the invention.

Next, referring to FIG. 8 and the following drawings, an example of the configuration of the information processing apparatus according to the embodiment of the invention will be described. FIG. 8 is a view that shows the configuration of an information processing apparatus that reproduces a content by inserting a disc that contains the content and a content code file that stores a content code that includes at least any one of a program or conversion data applied to a content reproducing process.

The information processing apparatus 200 inserts a disc 250 in a drive 201 to execute content reproducing process in a reproducing unit 202.

The reproducing unit 202 reads, from the disc, the content and the content code file that stores the content code that includes at least any one of a program or conversion data applied to the content reproducing process to reproduce the content. A signature verification unit 203 verifies a digital signature set for the content code file.

Note that the signature verification unit 203 executes signature verification with the different pieces of set signature target data between a signature verification process executed in reproducing the content recorded in a ROM disc and a signature verification process executed in reproducing the content recorded in a non-ROM disc other than the ROM disc.

As described with reference to FIG. 6, the content code file includes a prefix, attribute information of a content code, a content code and a signature. The prefix is a fixed data area (area that is not dependent on the content code file), and the attribute information of the content code and the content code are non-fixed data areas (data that can vary among content codes).

When the disc 250 is a ROM disc, a signature set for the content code file is a formal signature that uses the prefix, the identifier data and the content code as signature target data. When the disc 250 is a non-ROM disc other than the ROM disc, such as an R-type or an RE-type, a signature set to the content code file is a test signature that uses the identifier data and the content code as signature target data.

The signature verification unit 203 executes signature verification process corresponding to a formal signature that uses the prefix, the identifier data and the content code as signature target data in reproducing the content recorded in the ROM disc. The signature verification unit 203 executes signature verification process corresponding to a test signature that uses the identifier information and the content code as signature target data in reproducing the content recorded in the non-ROM disc.

The reproducing unit 202, if the signature verification is successfully executed by the signature verification unit 203, reproduces the content by applying the content code stored in the content code file for which verification of the signature is successful.

Next, the configuration of the information processing apparatus that prototypes a content code and conducts a test on the content code will be described with reference to FIG. 9. The information processing apparatus also basically has a configuration using the typical information processing apparatus (reproducer) 200 shown in FIG. 8.

The information processing apparatus 300, in addition to the typical information processing apparatus (reproducer) 200 shown in FIG. 8, includes a content code generating unit 301, a signature requesting unit 302 and a data recording unit 303. The content code generating unit 301 generates a content code file that stores a content code that includes at least any one of a program or conversion data applied to a content reproducing process. The signature requesting unit 302 executes a request for setting a digital signature for a content code file. The data recording unit 303 records a content and a content code file with a set signature in a disc.

Note that the disc may be a ROM disc similar to a disc used as a final product or a non-ROM disc other than the ROM disc (for example, an R or RE disc).

When the process of generating a content code file that stores a new content code is executed, the following process will be executed. The content code generating unit 301 generates a content code file that stores a content code that includes at least any one of a program or conversion data applied to a content reproducing process. The signature requesting unit 302 requests the content management administration to place a test signature on the content code file and then receives the content code file with the set test signature. The data recording unit 302 records the content code file with the set test signature and the content in a non-ROM disc other than the ROM disc (for example, an R or RE disc) 250.

Then, the signature verification unit 203 of the information processing apparatus 200 that executes reproducing process executes signature verification process on the test signature of the content code file, and, when the signature verification is successful, reads the content recorded in the non-ROM disc 250 and the content code file with the set test signature from the disc 250 to reproduce the content.

The signature requesting unit 302, when the content recorded in the non-ROM disc 250 is successfully reproduced, requests the content management administration to place a formal signature on the content code file and then receives the content code file with the set formal signature. As described with reference to FIG. 6, the formal signature uses a data area different from that of the test signature as signature target data.

Subsequently, the data recording unit 303 records the content and the content code file with the set formal signature in the ROM disc.

Then, the signature verification unit 203 of the information processing apparatus 200 that executes reproducing process executes signature verification process on the formal signature of the content code file, and, when the signature verification is successful, reads the content recorded in the ROM disc 250 and the content code file with the set formal signature from the disc 250 to reproduce the content.

When the reproducing process is successful, the process proceeds to manufacturing a disc provided for a user. In this case, a master disc manufacturing unit 310 manufactures a master disc that contains the content and the content code file with the set formal signature as recording data. After that, a disc manufacturing unit 320 manufactures a disc 330 using the master disc.

FIG. 10 is a view that shows the configuration of an information processing apparatus serving as an administration server that places a test signature or a formal signature. The server 400 includes a communication unit 401 and a digital signature generating unit 402.

The digital signature generating unit 402 generates a digital signature for a content code file that stores a content code that includes at least any one of a program or conversion data applied to a content reproducing process. The digital signature generating unit 402 executes signature generating process using different pieces of signature target data depending on the type of a signature generating request.

As described above, the content code file includes a fixed data area and a non-fixed data area. The digital signature generating unit 402 executes signature generating process using the fixed data area and the non-fixed data area as signature target data in response to a formal signature generating request, and executes signature generating process using the non-fixed data area as signature target data in response to a test signature generating request.

Specifically, the content code file includes a prefix that is an ID indicating that it is a content code, attribute information indicating the attribute (size, or the like) of the content code, and the content code. The digital signature generating unit 402 executes signature generating process using the prefix, the attribute information and the content code as signature target data in response to a formal signature generating request, and executes signature generating process using the attribute information and the content code as signature target data in response to a test signature generating request.

As described above, the embodiment of the invention is described in detail with reference to a specific embodiment. However, it is obvious that a person skilled in the art can modify or replace the embodiment without departing from the scope of the invention. That is, the embodiment of the invention is illustrative and should not be interpreted to limit the scope of the invention. To understand the scope of the invention, the scope of the claims should be referred to.

In addition, the series of processes described in the specification may be executed through hardware, software, or composite configuration of them. When the process is executed through software, it is possible to execute a program that contains the process sequence, which is installed into a memory inside a computer assembled to exclusive hardware, or to execute the program which is installed into a general-purpose computer that is able to execute various processes. For example, the program may be recorded in a recording medium in advance. The program may be not only installed from a recording medium to the computer but also received through a network, such as a LAN (Local Area Network) or the Internet, and then installed into a recording medium, such as an internal hard disk.

Note that various processes described in the specification are not limited to that they are executed in time sequence in accordance with the description; they may be executed parallel or separately depending on the performance of a device that executes the processes or where necessary. Note that the system in the present specification is a logically integrated configuration of a plurality of devices, and is not limited to the one that a device of each configuration is placed in the same casing.

The present application contains subject matter related to that disclosed in Japanese Priority Patent Application JP 2008-129140 filed in the Japan Patent Office on May 16, 2008, the entire content of which is hereby incorporated by reference.

What is claimed is:

1. An information processing apparatus comprising:
a reproducing unit that reads, from a disc, a content and a content code file storing a content code that includes at least any one of a program or conversion data applied to a content reproducing process, to execute the content reproducing process;
a signature verification unit that verifies a digital signature set for the content code file; and
a memory device that has executable instructions for at least one of the reproducing unit and the signature verification unit, wherein
the signature verification unit verifies the signature using different pieces of set signature target data between a signature verification process executed in a process of reproducing the content recorded in a ROM disc and a signature verification process executed in a process of reproducing the content recorded in a non-ROM disc other than the ROM disc, and
the reproducing unit, when signature verification is successfully executed by the signature verification unit, applies the content code stored in the content code file, for which signature verification is successful, to reproduce the content.

2. The information processing apparatus according to claim 1, wherein
the content code file includes a fixed data area and a non-fixed data area, and
the signature verification unit executes signature verification process on a formal signature that uses the fixed data area and the non-fixed data area as signature target data in reproducing the content recorded in the ROM disc, and executes signature verification process on a test signature that uses the non-fixed data area as signature target data in reproducing the content recorded in the non-ROM disc.

3. The information processing apparatus according to claim 1, wherein the content code file includes a prefix that is an ID indicating that it is a content code, attribute information of the content code, and the content code, and the signature verification unit executes signature verification process on a formal signature that uses the prefix, the attribute information and the content code as signature target data in reproducing the content recorded in the ROM disc, and executes signature verification process on a test signature that uses the attribute information and the content code as signature target data in reproducing the content recorded in the non-ROM disc.

4. The information processing apparatus according to claim 3, wherein the prefix is a fixed data area that is formed of fixed bit data.

5. The information processing apparatus according to claim 1, wherein the non-ROM disc is a data-recordable R-type or RE-type disc.

6. A non-transitory, computer-readable, storage medium storing a data structure that constitutes a content code file storing a content code that includes at least one of a program or conversion data applied to a content reproducing process, the data structure comprising:
   a prefix that is an ID indicating that it is a content code, attribute information of the content code, the content code, and a digital signature, wherein
   the digital signature is a test signature set using the attribute information and the content code as signature target data, and
   the data structure initiates an information processing apparatus to execute signature verification process on a test signature using the attribute information and the content code as signature target data in reproducing the content recorded in a non-ROM disc other than a ROM disc in the information processing apparatus.

7. A non-transitory, computer-readable, information recording medium that containing:
   a content; and
   a content code file that stores a content code that includes at least any one of a program or conversion data applied to a content reproducing process, wherein
   the content code file includes a prefix that is an ID indicating that it is a content code, attribute information that indicates attribute of the content code, the content code and a digital signature,
   the digital signature is a test signature set using the attribute information and the content code as signature target data, and
   the information recording medium initiates an information processing apparatus to execute signature verification process on a test signature using the attribute information and the content code as signature target data in reproducing the content recorded in a non-ROM disc other than a ROM disc in the information processing apparatus.

8. An information processing apparatus comprising:
   a content code generating unit that generates a content code file storing a content code that includes at least any one of a program or conversion data applied to a content reproducing process;
   a signature requesting unit that executes a request for setting a digital signature for the content code file;
   a data recording unit that records the content code file with a set signature and a content in a disc;
   a reproducing unit that reads the content and the content code file from the disc to execute the content reproducing process;
   a signature verification unit that verifies a digital signature set for the content code file; and
   a memory device that has executable instructions for at least one of the reproducing unit and the signature verification unit, wherein
   the signature verification unit verifies the signature using different pieces of set signature target data between a signature verification process executed in a process of reproducing the content recorded in a ROM disc and a signature verification process executed in a process of reproducing the content recorded in a non-ROM disc other than the ROM disc, and
   the reproducing unit, when signature verification is successfully executed by the signature verification unit, applies the content code stored in the content code file, for which signature verification is successful, to reproduce the content.

9. The information processing apparatus according to claim 8, wherein
   the content code file includes a fixed data area and a non-fixed data area, and
   the signature verification unit executes signature verification process on a formal signature that uses the fixed data area and the non-fixed data area as signature target data in reproducing the content recorded in the ROM disc, and executes signature verification process on a test signature that uses the non-fixed data area as signature target data in reproducing the content recorded in the non-ROM disc other than the ROM disc.

10. The information processing apparatus according to claim 8, wherein
    the content code file includes a prefix that is an ID indicating that it is a content code, attribute information of the content code, and the content code, and
    the signature verification unit executes signature verification process on a formal signature that uses the prefix, the attribute information and the content code as signature target data in reproducing the content recorded in the ROM disc, and executes signature verification process on a test signature that uses the attribute information and the content code as signature target data in reproducing the content recorded in the non-ROM disc other than the ROM disc.

11. The information processing apparatus according to claim 10, wherein the prefix is a fixed data area that is formed of fixed bit data.

12. The information processing apparatus according to claim 8, wherein the non-ROM disc is a data-recordable R-type or RE-type disc.

13. An information processing apparatus comprising:
    a digital signature generating unit that generates a digital signature for a content code file storing a content code that includes at least any one of a program or conversion data applied to a content reproducing process, the content code file including a fixed data area and a non-fixed data area, the signature generating unit executes signature generating process that uses the fixed data area and the non-fixed data area as signature target data in response to a formal signature generating request, and executes signature generating process that uses the non-fixed data as signature target data in response to a test signature generating request; and
    a memory device that has executable instructions for the digital signature generating unit, wherein the digital signature generating unit executes signature generating process with different pieces of set signature target data depending on a type of signature generating request.

14. The information processing apparatus according to claim 13, wherein
- the content code file includes a prefix that is an ID indicating that it is a content code, attribute information of the content code, and the content code, and
- the signature generating unit executes signature generating process that uses the prefix, the attribute data and the content code as signature target data in response to a formal signature generating request, and executes signature generating process that uses the attribute data and the content code as signature target data in response to a test signature generating request.

15. An information processing method executed in an information processing apparatus, comprising the steps of:
- executing content reproducing process by reading, from a disc, a content and a content code file storing a content code that includes at least any one of a program or conversion data applied to the content reproducing process by a reproducing unit; and
- verifying a digital signature set for the content code file by a signature verification unit, wherein
- when the digital signature is verified, the signature is verified using different pieces of set signature target data between a signature verification process executed in a process of reproducing the content recorded in a ROM disc and a signature verification process executed in a process of reproducing the content recorded in a non-ROM disc other than the ROM disc, and
- when the content reproducing process is executed, and when signature verification is successfully executed by the signature verification unit, the content code stored in the content code file, for which signature verification is successful, is applied to reproduce the content.

16. A disc manufacturing method executed in a disc manufacturing apparatus, comprising the steps of:
- generating a content code file storing a content code that includes at least any one of a program or conversion data applied to a content reproducing process by a content code generating unit;
- recording a content and a content code file with a set test signature, which is a digital signature, for the content code file in a non-ROM disc, other than a ROM disc, by a data recording unit;
- executing signature verification process on the test signature of the content code file by a signature verification unit;
- executing content reproducing process by reading the content and the content code file with the set test signature, which are recorded in the non-ROM disc, from the disc;
- when the content reproducing process is successfully executed by reading the content and the content code file with the set test signature, which are recorded in the non-ROM disc, from the disc, recording the content and the content code file with a set formal signature, that uses a data area different from that of the test signature as a signature target, as a digital signature for the content code file by the data recording unit;
- executing signature verification process on the formal signature of the content code file by the signature verification unit;
- executing content reproducing process by reading the content and the content code file with the set formal signature, which are recorded in the ROM disc, from the disc;
- when the content reproducing process is successfully executed by reading the content and the content code file with the set formal signature, which are recorded in the ROM disc, from the disc, manufacturing a master disc that contains the content and the content code file with the set formal signature as recording data by a master disc manufacturing unit; and
- manufacturing a disc by applying the manufactured master disc by a manufacturing unit.

17. The disc manufacturing method according to claim 16, wherein
- the content code file includes a fixed data area and a non-fixed data area,
- when the content and the content code file are recorded in the non-ROM disc, the content and the content code file with the set test signature that uses the non-fixed data area as signature target data are recorded in the non-ROM disc other than the ROM disc, and
- when the content and the content code file are recorded in the ROM disc, the content and the content code file with the set formal signature that uses the fixed data area and the non-fixed data area as signature target data are recorded in the ROM disc.

18. The disc manufacturing method according to claim 16, wherein the non-ROM disc is a data-recordable R-type or RE-type disc.

19. A non-transitory, computer-readable, storage medium storing a program for causing an information processing apparatus to execute information processing, comprising the steps of:
- executing content reproducing process by reading, from a disc, a content and a content code file storing a content code that includes at least any one of a program or conversion data applied to the content reproducing process by a reproducing unit; and
- verifying a digital signature set for the content code file by a signature verification unit, wherein
- when the digital signature is verified, the signature is verified using different pieces of set signature target data between a signature verification process executed in a process of reproducing the content recorded in a ROM disc and a signature verification process executed in a process of reproducing the content recorded in a non-ROM disc other than the ROM disc, and
- when the content reproducing process is executed, and when signature verification is successfully executed by the signature verification unit, the content code stored in the content code file, for which signature verification is successful, is applied to reproduce the content.

* * * * *